US009928732B2

(12) United States Patent
Tian et al.

(10) Patent No.: US 9,928,732 B2
(45) Date of Patent: Mar. 27, 2018

(54) OPTICAL FIBER-BASED REMOTE GAS LEAKAGE MONITORING

(71) Applicant: NEC Laboratories America, Inc., Princeton, NJ (US)

(72) Inventors: Yue Tian, Princeton, NJ (US); Akihiro Tanaka, Kawasaki (JP)

(73) Assignee: NEC Corporation (JP)

( * ) Notice: Subject to any disclaimer, the term of this patent is extended or adjusted under 35 U.S.C. 154(b) by 426 days.

(21) Appl. No.: 14/683,207

(22) Filed: Apr. 10, 2015

(65) Prior Publication Data

US 2015/0294561 A1  Oct. 15, 2015

Related U.S. Application Data

(60) Provisional application No. 61/978,044, filed on Apr. 10, 2014, provisional application No. 61/978,048, filed on Apr. 10, 2014.

(51) Int. Cl.
| | |
|---|---|
| *G08C 17/00* | (2006.01) |
| *G08C 23/06* | (2006.01) |
| *H04Q 11/00* | (2006.01) |
| *H04L 12/24* | (2006.01) |
| *H04L 12/26* | (2006.01) |
| *H04Q 9/00* | (2006.01) |
| *H04J 14/02* | (2006.01) |

(52) U.S. Cl.
CPC .......... *G08C 23/06* (2013.01); *H04J 14/0221* (2013.01); *H04J 14/0282* (2013.01); *H04L 41/0813* (2013.01); *H04L 43/0864* (2013.01); *H04L 43/12* (2013.01); *H04Q 9/00* (2013.01); *H04Q 11/0067* (2013.01); *H04Q 2011/0026* (2013.01); *H04Q 2011/0083* (2013.01)

(58) Field of Classification Search
CPC ............... G01N 21/774; G01N 21/783; G01N 2021/7773; G01N 21/0303; G08C 17/00
USPC ...................................................... 340/870.28
See application file for complete search history.

(56) References Cited

U.S. PATENT DOCUMENTS

| | | | | |
|---|---|---|---|---|
| 5,202,570 A | * | 4/1993 | Tanaka ................... | G01N 21/39 250/205 |
| 2002/0088929 A1 | * | 7/2002 | Kittaka ................... | B82Y 20/00 250/226 |
| 2002/0125413 A1 | * | 9/2002 | Saini ..................... | G01N 21/774 250/227.14 |

(Continued)

OTHER PUBLICATIONS

KinPui Chan et al., "An Optical-Fiber-Based Gas Sensor for Remote Absorption Measurement of Low-Level CH_4 Gas in the Near-Infrared Region" Journal of Lightwave Technology LT-2(3):234-237 (Jun. 1984) http://ieeexplore.ieee.org/stamp/stamp.jsp?arnumber=01073609.

(Continued)

*Primary Examiner* — Steven Lim
*Assistant Examiner* — Kam Ma
(74) *Attorney, Agent, or Firm* — Joseph Kolodka

(57) ABSTRACT

An analyzer operable with an optical network is responsive to a probe signal reflected by a sensor in the network to convey information about targeted matter in air in the sensor. Multiple sensors at different locations in the network can be associated with respective selective optical wavelength filtering thereby enabling the analyzer to associated respective ones of the sensors.

14 Claims, 6 Drawing Sheets

(56) References Cited

U.S. PATENT DOCUMENTS

| | | | | |
|---|---|---|---|---|
| 2007/0131882 A1* | 6/2007 | Richman | ............... | G01J 3/4338 |
| | | | | 250/573 |
| 2008/0130101 A1* | 6/2008 | Kakui | ................. | H01S 3/10007 |
| | | | | 359/341.3 |
| 2011/0320147 A1* | 12/2011 | Brady | ...................... | G01V 1/40 |
| | | | | 702/66 |
| 2012/0176606 A1* | 7/2012 | Zadorozhny | ....... | G01D 5/35361 |
| | | | | 356/73.1 |
| 2012/0212824 A1* | 8/2012 | Sakurai | ................... | G02B 5/28 |
| | | | | 359/579 |
| 2013/0271769 A1* | 10/2013 | Handerek | ............... | E21B 47/06 |
| | | | | 356/446 |

OTHER PUBLICATIONS

Jiasheng Ni et al., "Fiber methane gas sensor and its application in methane outburst prediction in coal mine" J. of Electronic Science and Technology of China 6(4):373-376 (Nov. 2008) http://ieeexplore.ieee.org/stamp/stamp.jsp?tp=&arnumber=5226294.

* cited by examiner

OPTICAL FIBER-BASED REMOTE GAS LEAKAGE MONITORING

RELATED APPLICATION INFORMATION

This application claims priority to provisional application No. 61/978,044, filed Apr. 10, 2014, entitled "Optical Fiber-Based Remote gas leakage Monitoring with Sensor Identifier", claims priority to provisional application 61/978,048, filed Apr. 10, 2014, entitled "Optical Fiber-Based Remote Gas Leakage Monitoring using Discovery process in PON" and is related to co-pending patent application Ser. No. 14/683,210, filed Apr. 10, 2015, entitled "Optical Fiber-based Remote Gas leakage Monitoring", the contents thereof are incorporated herein by reference.

BACKGROUND OF THE INVENTION

The present invention relates generally to optics, and more particularly, to optical fiber-based remote gas leakage monitoring with sensor identifier.

Following the rapid growth of the internet traffic, optical fiber is exhaustively deployed especially in metropolitan area as the optical access network infrastructure. In the optical access network, multiple optical channels are launched using a wavelength division multiplexing (WDM) technique following established standards. Wavelength allocation in typical standards, gigabit Ethernet-passive optical network (GE-PON), ten Gigabit Ethernet (10 GbE) PON, and future time and wavelength division multiplexing (TWDM) PON are summarized with fiber loss in FIG. 2. As shown in FIG. 2, upstream (US) and downstream (DS) for 1G, 10G and multiple wavelength (X) channels in TWDM-PON are allocated from 1,280 nm to 1,625 nm. Wavelength region from 1,625 nm to 1,650 nm is reserved for future use. Therefore, a wavelength window longer than 1,650 nm is free in the current standards.

A challenge for fiber-based remote methane gas leakage monitoring in an optical network is how to identify a particular gas sensor. An optical distribution network in a PON setting has multiple optical fiber lines after a passive optical splitter and the probe signal is returned from multiple sensors. If distance from optical line terminal OLT to one optical network unit ONU is different from the distance from another OLT to another ONU, two probe signal pulses returned from the two different OLTs are distinguishable based on referring difference in the different round-trip times. However, it is hard to identify the two probe signals returned from the two different OLTs from the OLT to their respective ONUs are similar.

Prior activity of remote methane gas leakage monitoring is limited to use of one optical fiber line for one sensor thereby avoiding a sensor identification problem. Such one optical fiber line use for one sensor is severely limited and cannot be used in existing network infrastructures.

Accordingly, there is a need for identifying gas leakage sensors in an optical network that overcomes limitations of current capabilities.

BRIEF SUMMARY OF THE INVENTION

The present invention is directed to an apparatus that includes an analyzer operable with an optical network including at least one sensor optically responsive to its surrounding air The analyzer can be responsive to a probe signal combinable with and separable from transmission channels moving in the optical network, the probe signal can be reflected by the sensor to convey information about targeted matter in air in the sensor, and the probe signal from the sensor can be converted from optical to electrical form to be processed by the analyzer for information about the targeted matter and identification of the sensor. Multiple ones of the sensor at different locations in the network can be associated with respective selective optical wavelength filtering thereby enabling the analyzer to identify respective ones of the sensor.

In a similar aspect of the invention, there is provided a method that includes analyzing a probe signal within an optical network including at least one sensor optically responsive to its surrounding air. The probe signal is combinable with and separable from transmission channels moving in the optical network, the probe signal can be reflected by the sensor to convey information about targeted matter in air in the sensor, and the probe signal from the sensor can be converted from optical to electrical form to be processed by the analyzing for information about the targeted matter and identification of the sensor. Multiple ones of the sensor at different locations in the network can be associated with respective selective optical wavelength filtering thereby enabling the analyzing to identify respective ones of the sensor.

These and other advantages of the invention will be apparent to those of ordinary skill in the art by reference to the following detailed description and the accompanying drawings.

DETAILED DESCRIPTION

The present invention includes use of a fiber Bragg grating (FBG) based sensor identifier located near the sensor head, and each FBG has a different grating pattern. By doing so, probe pulse shapes returned from each sensor head become different among each other returned pulse can identify its corresponding sensor in the network.

Figure 1:
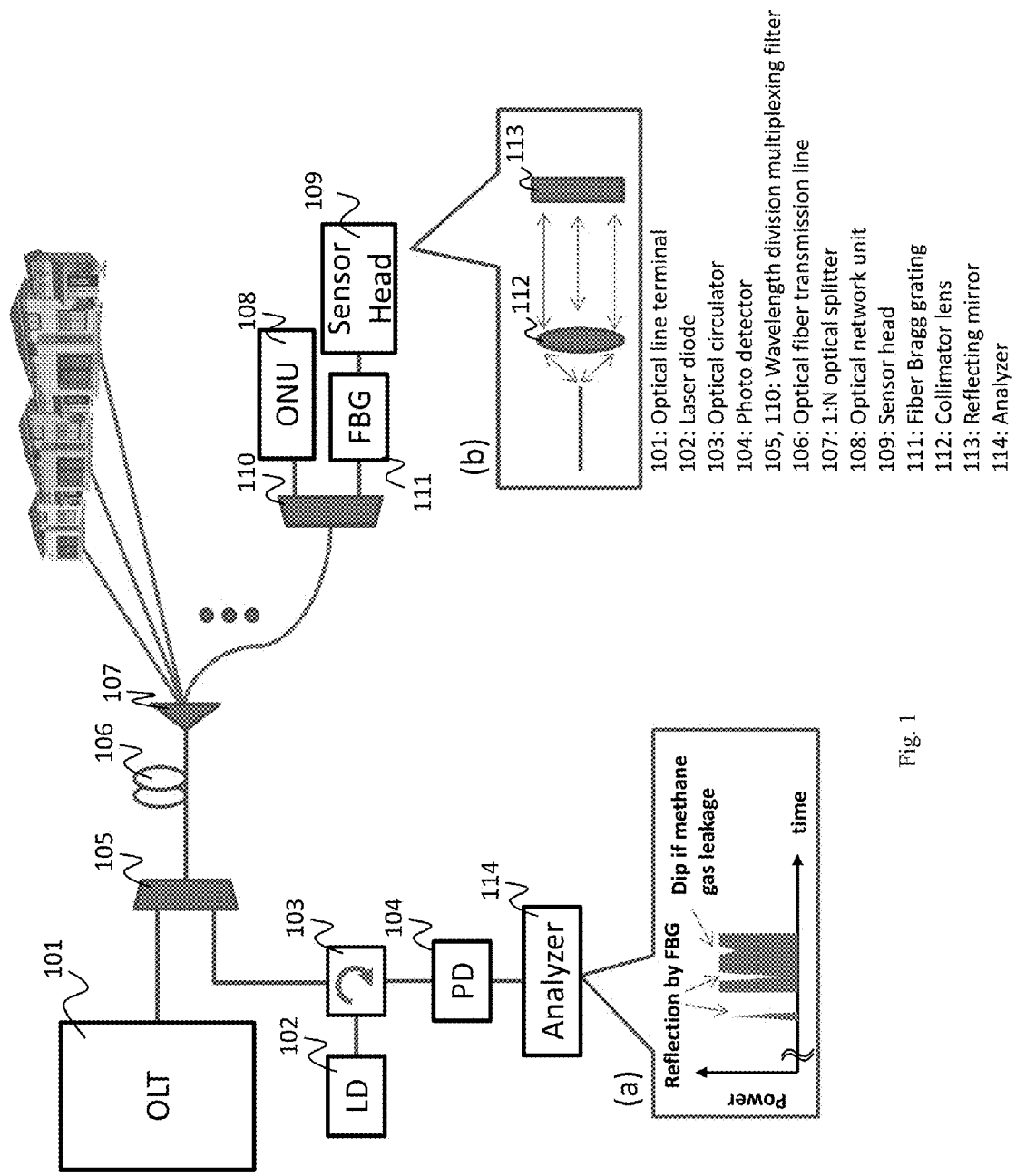
FIG. 1 shows an exemplary passive optical network PON employing the inventive optical sensor identification associated with a remote sensor on the PON detecting methane gas leakage.

FIG. 1 depicts an exemplary form of the proposed invention. A probe optical pulse signal from a laser diode LD (102) is combined with other communication channels from/to optical line terminal OLT (101) by a wavelength division multiplexing filter WDM filter (105) via an optical circulator (103), coupled to an optical transmission fiber (106). At the optical network unit ONU (108) side, the probe signal is de-multiplexed from the other communication channels from/to ONU (108) by a WDM filter 110. A particular wavelength component of the probe signal is reflected by a fiber Bragg grating FBG (111), and the remaining wavelength component of the probe signal is reflected by a sensor head (109). The sensor head (109) consists of a collimator lens (112) and a mirror (113), and the probe signal is propagated in air between the collimator lens (112) and the mirror (113) to have an interaction with methane gas in the surrounding air.

The probe signal returns back to the OLT side via the WDM filter (110), a passive splitter (107), and optical transmission fiber (106). The returned probe signal is separated from the other communication channels by the WDM filter (105), and then it is converted from an optical signal to an electrical signal by a PD (104) through an optical circulator (103). Due to the fiber Bragg grating FBG (111), a particular wavelength component is reflected in advance of the remaining wavelength component and the returned probe signal can be measured as shown in inset (a) of figure FIG. 1. When methane gas concentration is high enough around the sensor head (109), a weak dip is measured on the probe pulse. By using FBGs with a different reflection wavelength at each respective sensor, an analyzer or controller (114) can identify each returned probe pulse to each sensor.

Figure 2:
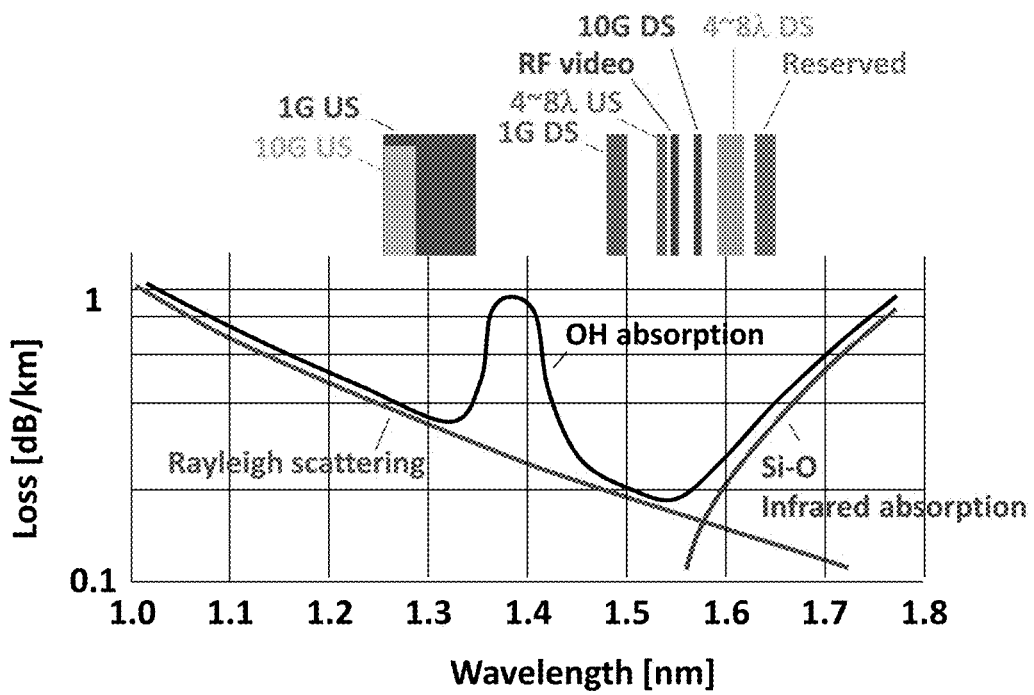
FIG. 2 shows a plot of fiber loss versus wavelength to summarize fiber loss for wavelength allocation in typical standards, gigabit Ethernet passive optical network (GE-PON), ten Gigabit Ethernet (10 GbE) PON, and future time and wavelength division multiplexing (TWDM) PON.

Wavelength allocation in typical standards, gigabit Ethernet passive optical network (GE-PON), ten Gigabit Ethernet (10 GbE) PON, and future time and wavelength division multiplexing (TWDM) PON are summarized with fiber loss shown in FIG. 2. As shown in FIG. 2, upstream (US) and downstream (DS) for 1G, 10G and multiple wavelength (X) channels in TWDM-PON are allocated from 1,280 nm to 1,625 nm. The wavelength region from 1,625 nm to 1,650 nm is reserved for future use. Therefore, a wavelength window longer than 1,650 nm is free in the current standards.

Figure 3:
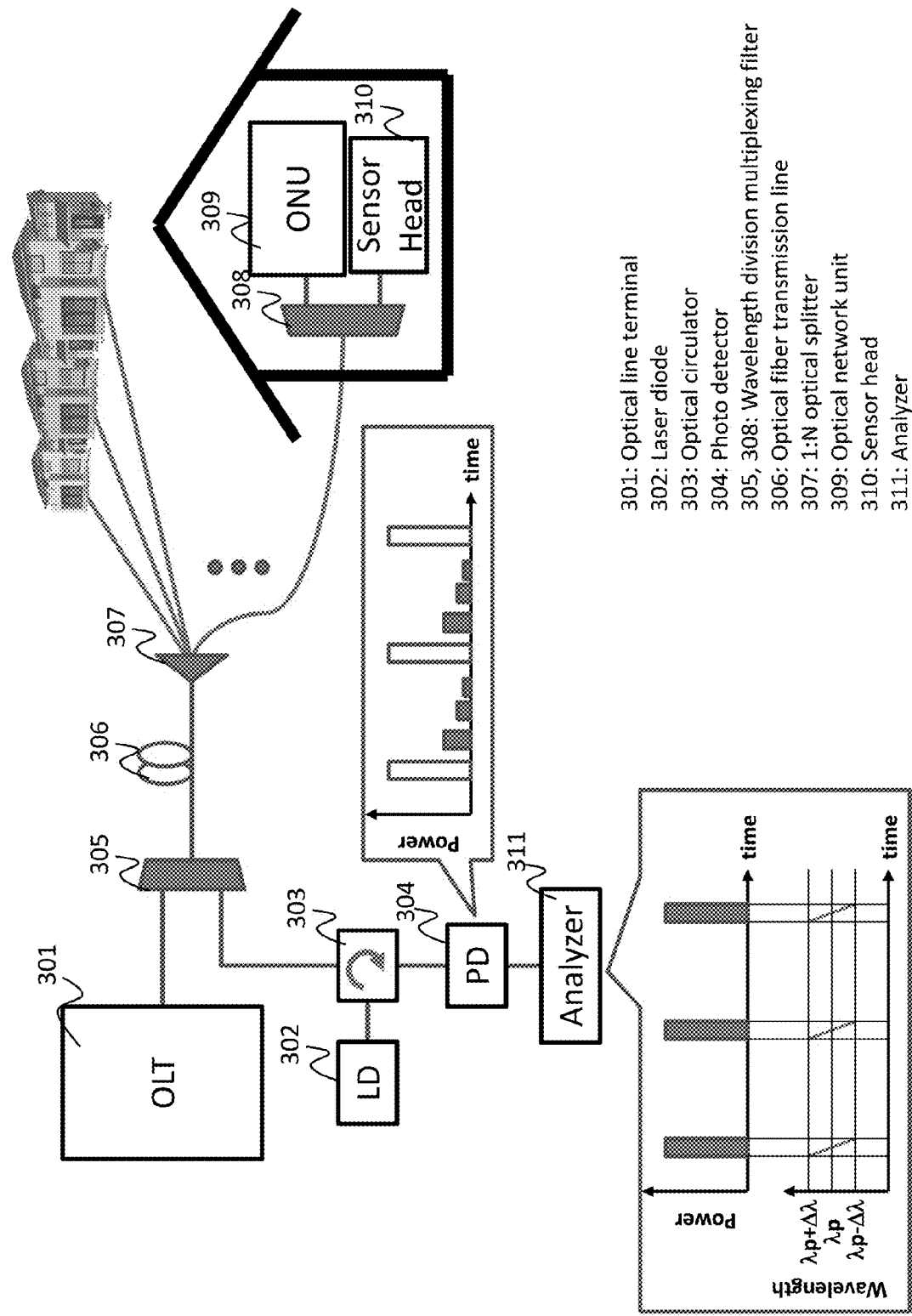
FIG. 3 illustrates methane gas detection overlaid on an exemplary passive optical network PON, in accordance with the invention. The passive optical network in FIG. 3 is operationally similar to that of the network discussed with regard FIG. 1 as a comparison of the descriptions in the legends for the respective reference numerals for both FIG. 1 and FIG. 3 confirm substantial similarity between the elements of the two PONs. For the sake of clarity, discussion of FIG. 3 is limited to aspects of the exemplary PON of FIG. 3 considered relevant to an understanding of the invention.

Meanwhile, absorption spectra of methane ($CH_4$) exist at 1,651 nm and 1,654 nm. Using the unoccupied wavelength longer than 1,650 nm, methane gas detection service can be overlaid on existing PON service as shown in FIG. 3. In this network of FIG. 3, a probe signal whose wavelength is changing around 1,651 nm or 1,654 nm from a laser diode (LD) 302 is multiplexed with transmission channels using a WDM filter 305 at the optical line terminal (OLT) side, de-multiplexed from other transmission channels at optical network unit (ONU) (301) side, and exposed to air to measure methane gas concentration around ONU. The probe signal is reflected and again multiplexed with other communication channels, returned through transmission fiber (306), de-multiplexed (305) from the other channels at the OLT (301), and optical-to-electrical converted with photo diode (PD) 304 followed by signal processing by an analyzer or controller 311.

The invention enables methane gas leakage information at several monitoring points to be collected at OLT (301) with passive sensor heads located at ONUs. As the sensor head is completely passive, this scheme is beneficial in terms of cost, maintenance, and ease of installation. This gas leakage monitoring system is even safer than commercial natural gas alarms for home use, because this system enables continuous gas leakage monitoring even when residents are out of home, in the case of power outage, and gas alarm equipment failure.

Figure 4:
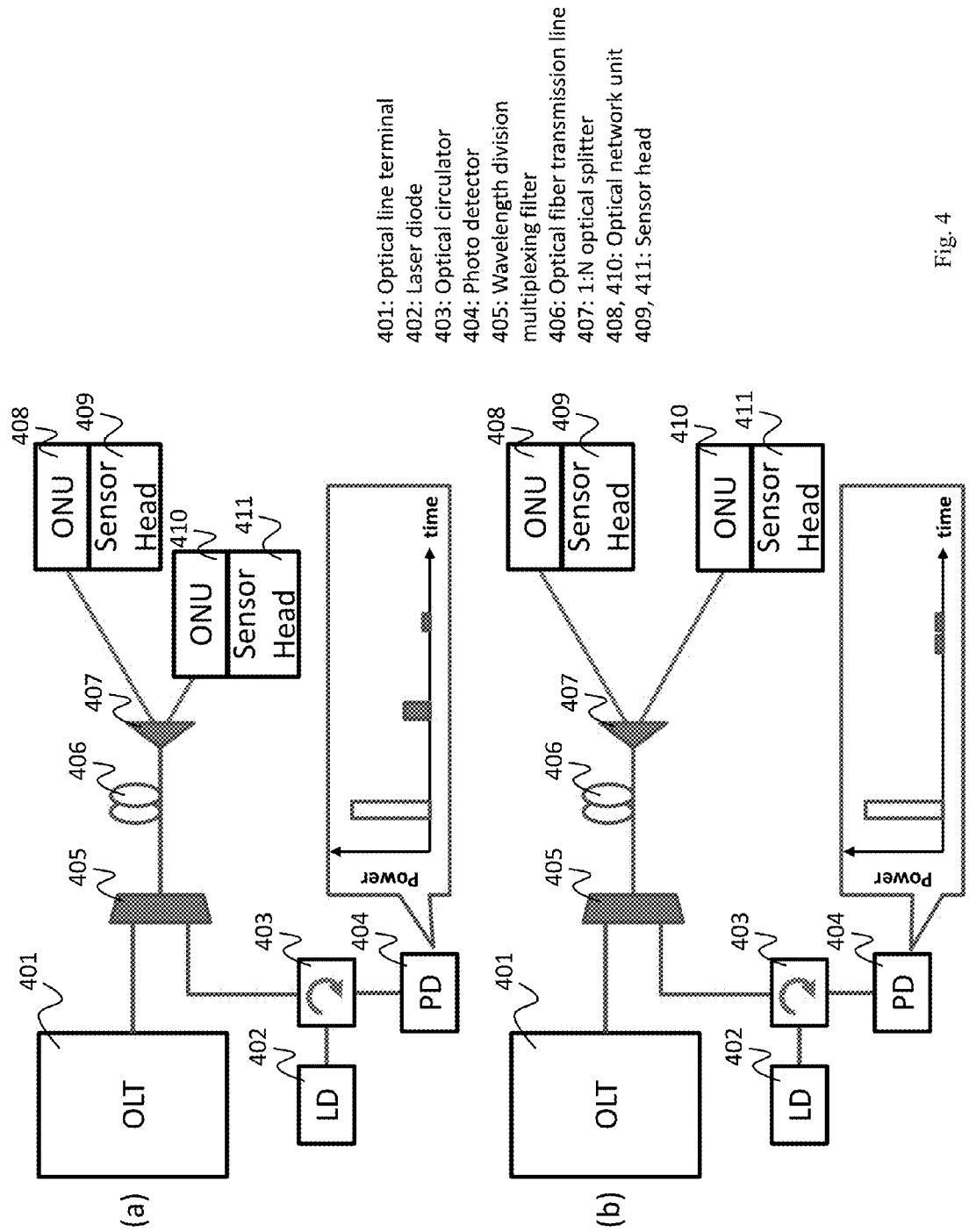
FIG. 4 illustrates power level variations detected in probe signals from different sensors: in (a) different distances from the sensor head ONUs back to the OLT result in different power levels detected in corresponding probe signals and in (b) similar distances from the sensor head ONUs back to the OLT result in indistinguishable power levels detected in corresponding probe signals. The passive optical network in FIG. 4 is operationally similar to that of the network discussed with regard to FIG. 1 as a comparison of the descriptions in the legends for the respective reference numeral legends for both FIG. 1 and FIG. 4 confirm substantial similarity between the elements of the two PONs. For the sake of clarity, discussion of FIG. 4 is limited to aspects of the exemplary PON of FIG. 4 considered relevant to an understanding of the invention.

A challenge in this fiber-based remote methane gas leakage monitoring system is how to identify particular gas sensor. As optical distribution network in PON has multiple optical fiber lines after a passive optical splitter (307), the probe signal is returned from multiple sensors. If distance from/to the OLT to an ONU (408) is different from the distance from the OLT to an ONU (410), like FIG. 4(a), two probe signal pulses returned from ONU (408) and ONU (410) are distinguishable based on differences in their respective round-trip times. However, it is hard to distinguish between different gas leakage sensors at different ONUs, and therefore identify them individually, if the distances from the OLT to each different ONU are similar, see FIG. 4(b).

Figure 5:
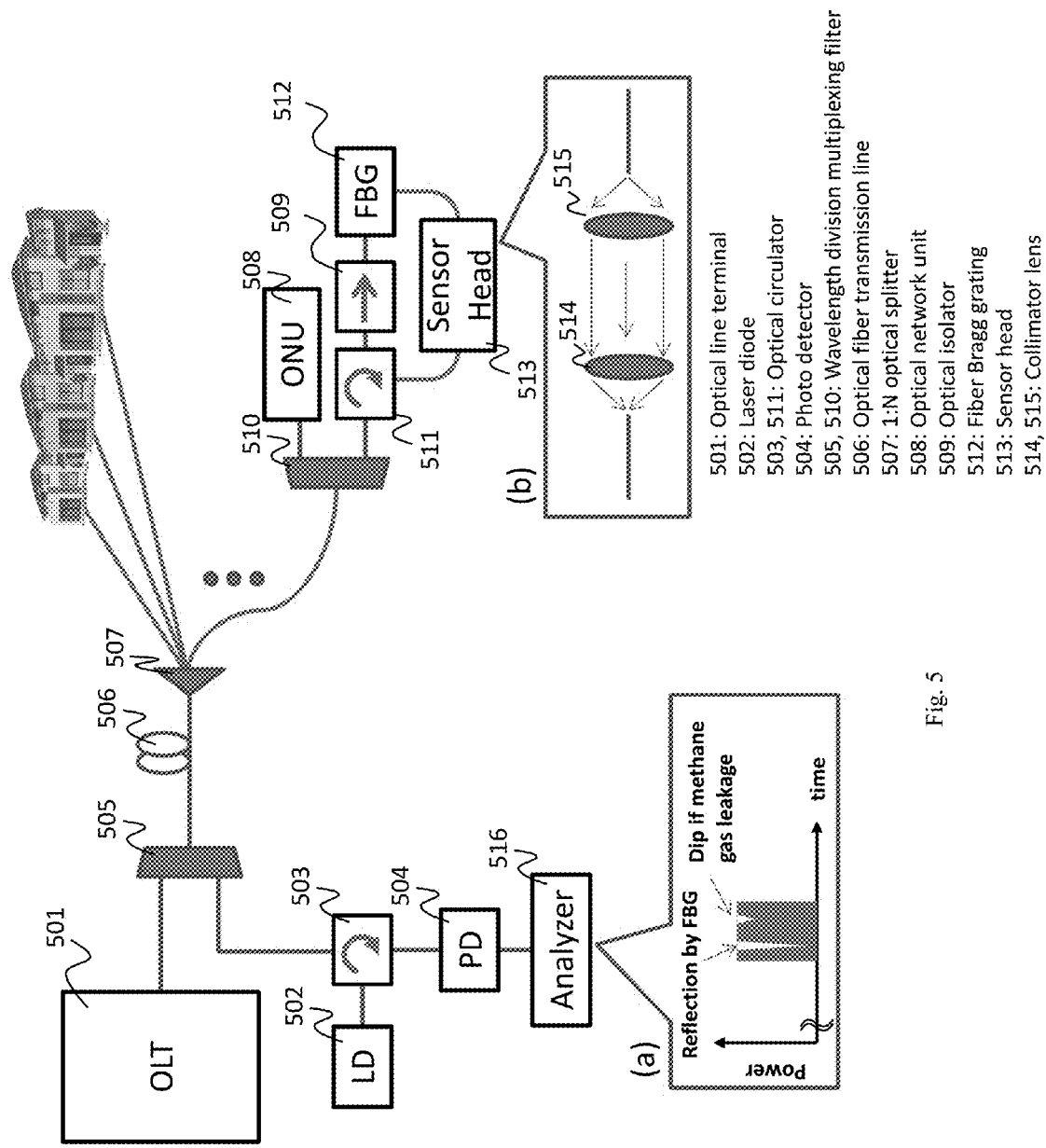
FIG. 5 illustrates the PON configuration of FIG. 1 modified to address the sensor identification limitation shown in FIG. 4 (b). The passive optical network PON in FIG. 5 is operationally similar to that of the PON discussed with regard to FIG. 1 as a comparison of the descriptions in the legends for the respective reference numeral legends for both FIG. 1 and FIG. 5 confirm substantial similarity between the elements of the two PONs. For the sake of clarity, discussion of FIG. 5 is limited to aspects of the exemplary PON of FIG. 5 considered relevant to an understanding of the invention.

The configuration in FIG. 5, addresses the situation where returned probe signals have similar path distances back to the OLT. The remote sensor consists of a circulator (511), an optical isolator (509), an FBG (512), and a sensor head (513). The sensor head (513) consists of two collimator lenses (514, 515) and the probe signal is propagated in air between these lenses. In this configuration, a wavelength component reflected by the FBG (512) is terminated by an optical isolator (509), and no advance optical pulse is measured at a PD (504), see inset figure FIG. 5(a) compared to the inset in FIG. 1(a).

Figure 6:
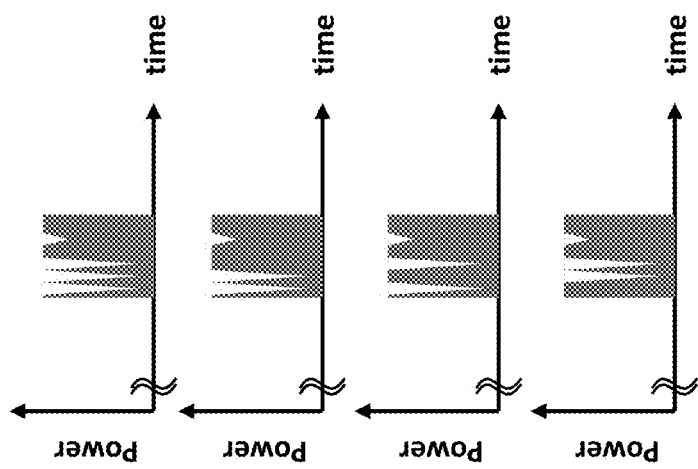
FIG. 6 shows an example of combining multiple reflection wavelengths for identifying different sensors. In the example shown, eight sensors can be identified with three reflection wavelengths.
Figure 6:
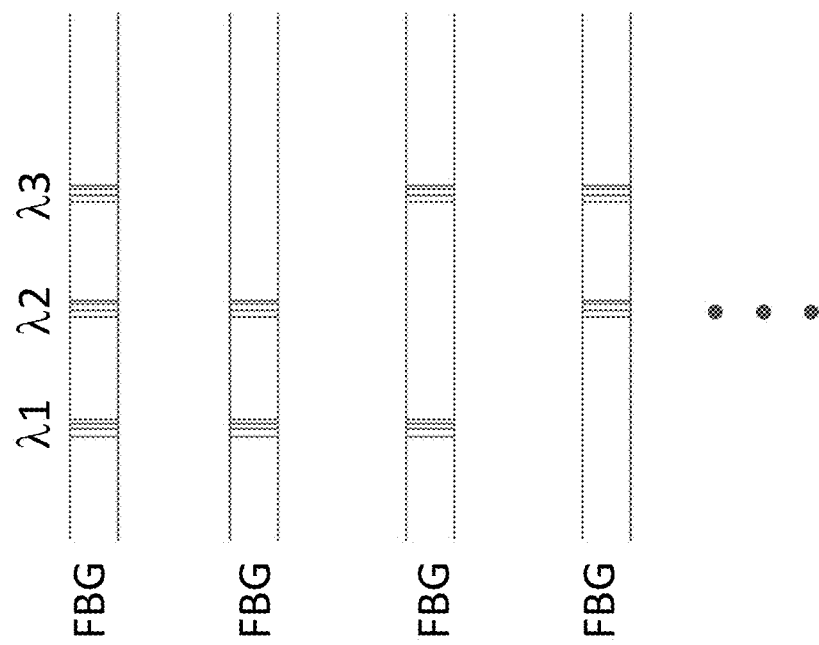

The FBG based sensor identification of the present invention can be used to identify respective multiple sensors in a PON based environment. An exemplary application of the inventive FBG-based sensor identification is shown in FIG. 6. By combining multiple reflection wavelengths, for example eight sensors can be identified with three reflection wavelengths resulting in different dip patterns in the returned probe signals when methane gas leakage is detected by corresponding sensor heads in the PON.

The invention may be implemented in optical components, controller/computer or analyzer components that include hardware, firmware or software, or a combination of the three as well as optical components. Preferably, data processing or analyzing aspects of the invention is implemented in a processing executed on a programmable processor or a controller having a processor, a data storage system, volatile and non-volatile memory and/or storage elements, at least one input device and at least one output device. More details are discussed in U.S. Pat. No. 8,380,557, the content of which is incorporated by reference.

Figure 7:
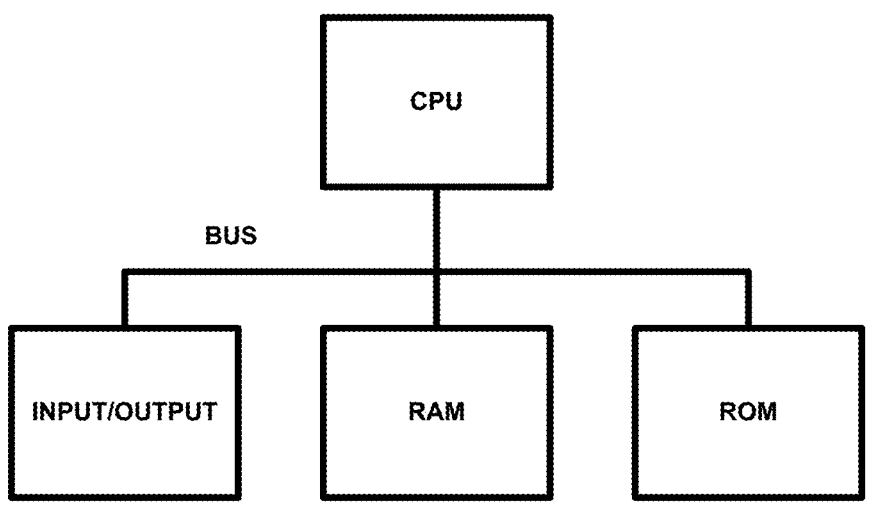
FIG. 7 is a diagram of an exemplary processor or analyzer for implementing analyzing of probe signals corresponding to remote sensors responsive to methane gas leakage.

By way of example, a block diagram of a computer or controller or analyzer to support the invention is discussed next in FIG. 7. The computer or controller preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing, it can be appreciated that the present invention can be applied to invention, fiber-based remote methane gas leakage monitoring system can be overlaid on existing PON infrastructure, and methane gas leakage can be monitored at each remote sensing point without inducing monitoring point identification error. Moreover, as the sensor head is completely passive even after applying the proposed invention, the monitoring system can be low cost, easily installed, and needs less maintenance.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. An apparatus comprising:
   an analyzer operable with an optical network including at least one sensor optically responsive to its surrounding air and a probe signal is propagated in air through a filter, a mirror, and a collimator lens between the filter and the mirror to have an interaction with a gas in the surrounding air and light is coupled back to a fiber through the filter and transmitted to an OLT side,
   wherein the analyzer is responsive to a probe signal combinable with and separable from transmission channels moving in the optical network, the probe signal is propagated in air through the sensor comprising a filter, a mirror, and a collimator lens between the filter and the mirror to have an interaction with targeted matter in the air between the collimator lens and the mirror, reflected by the sensor to convey information about the targeted matter in air in the sensor, coupled back to a fiber through the filter and transmitted to an optical line terminal (OLT) side, and
   the probe signal from the sensor is converted from optical to electrical form to be processed by the analyzer for information about the targeted matter and identification of the sensor; wherein multiple ones of the sensor at different locations in the optical network are associated with respective selective optical wavelength filtering thereby enabling the analyzer to identify respective ones of the sensor.

2. The apparatus of claim 1, wherein the select optical wavelength filtering for identifying the sensor on the network includes the filter comprising a fiber Bragg grating configured for selective wavelength filtering.

3. The apparatus of claim 1, wherein the information about the targeted matter in the probe signal comprises changes in the probe signal responsive to concentration levels of the targeted matter in the air, the targeted matter exhibiting respective absorption spectra to light.

4. The apparatus of claim 1, wherein the filter sensor comprises a fiber Bragg grating.

5. The apparatus of claim 1, wherein the sensor comprises a circulator, an optical isolator, and the filter comprising a fiber Bragg grating that is configured for selectively filtering wavelengths in the probe signal to enable identifying a respective one of the sensors.

6. The apparatus of claim 5, wherein the sensor further comprises a sensor head comprising two collimator lenses with the probe signal being interactable with the targeted matter in air between the collimator lens and reflector mirror.

7. The apparatus of claim 1, wherein the probe signal carrying information about the targeted matter in the sensor is processed by the analyzer to reveal dips in the probe signal responsive to absorption spectra of the targeted matter.

8. A method comprising:
   analyzing a probe signal within an optical network including at least one sensor optically responsive to its surrounding air and a probe signal is propagated in air between a collimator lens and a mirror to have an interaction with a gas in the surrounding air,
   wherein the probe signal is combinable with and separable from transmission channels moving in the optical network, the probe signal is propagated in air through the sensor comprising a filter, a mirror, and a collimator lens between the filter and the mirror to have an interaction with targeted matter in the air between the collimator lens and the mirror, reflected by the sensor to convey information about the targeted matter in air in the sensor, coupled back to a fiber through the filter and transmitted to an optical line terminal (OLT) side, and the probe signal from the sensor is converted from optical to electrical form to be processed by the analyzing for information about the targeted matter and identification of the sensor; wherein multiple ones of the sensor at different locations in the network are associated with respective selective optical wavelength filtering thereby enabling the analyzing to identify respective ones of the sensor.

9. The method of claim 8, wherein the select optical wavelength filtering for identifying the sensor on the network includes the filter comprising a fiber Bragg grating configured for selective wavelength filtering.

10. The method of claim 8, wherein the information about the targeted matter in the probe signal comprises changes in the signal responsive to concentration levels of the targeted matter in the air, the targeted matter exhibiting specific absorption spectra to light.

11. The method of claim 8, wherein the filter sensor comprises a fiber Bragg grating and a sensor head that includes a collimator lens and reflector mirror, the probe signal being interactable with the targeted matter in air between the collimator lens and reflector mirror.

12. The method of claim 8, wherein the sensor comprises a circulator, an optical isolator, and the filter comprising a fiber Bragg grating that can be is configured for selectively filtering wavelengths in the probe signal to enable identifying a respective one of the sensors.

13. The method of claim 12, wherein the sensor further comprises a sensor head comprising two collimator lenses with the probe signal being interactable with the targeted matter in air between the collimator lens and reflector mirror.

14. The method of claim 8, wherein the probe signal carrying information about the targeted matter in the sensor is processed by the controller to reveal dips in the probe signal responsive to absorption spectra of the targeted matter.

* * * * *